Sept. 4, 1962 J. CELADA 3,052,457
ORE TREATING APPARATUS
Filed May 1, 1958 4 Sheets-Sheet 1
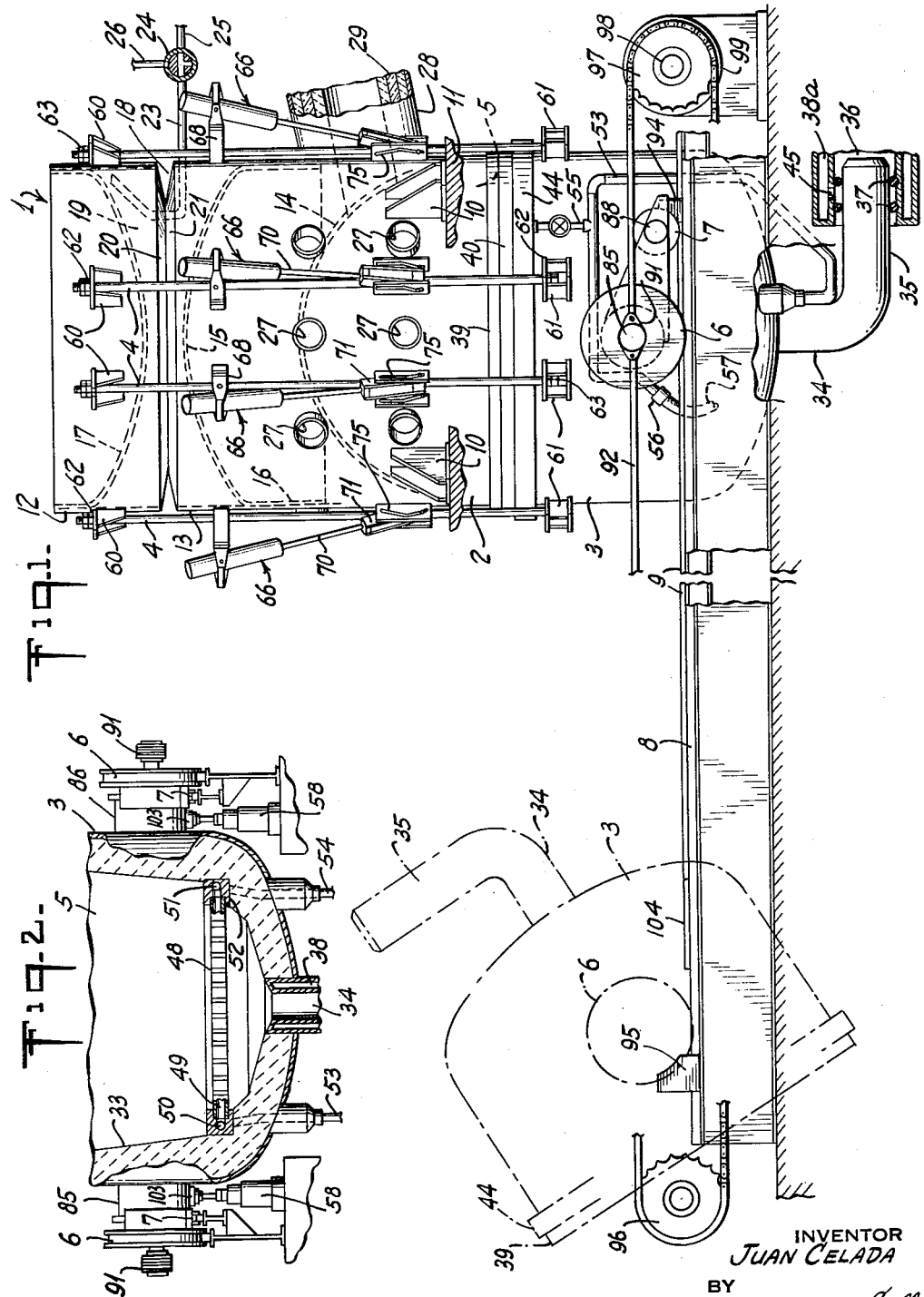
INVENTOR
JUAN CELADA
BY
Curtis, Morris & Safford
ATTORNEYS

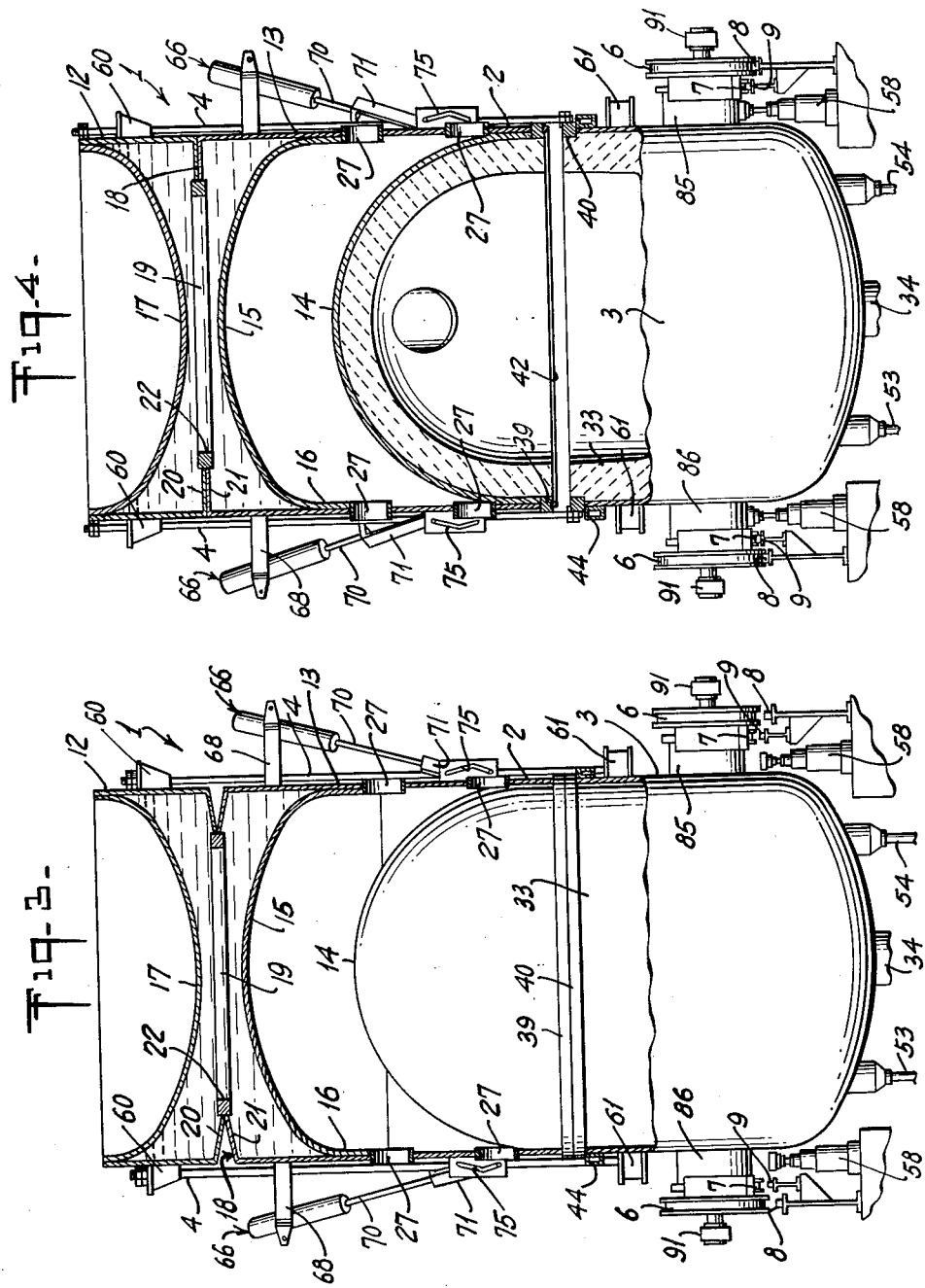

Sept. 4, 1962
J. CELADA
3,052,457
ORE TREATING APPARATUS
Filed May 1, 1958
4 Sheets-Sheet 3
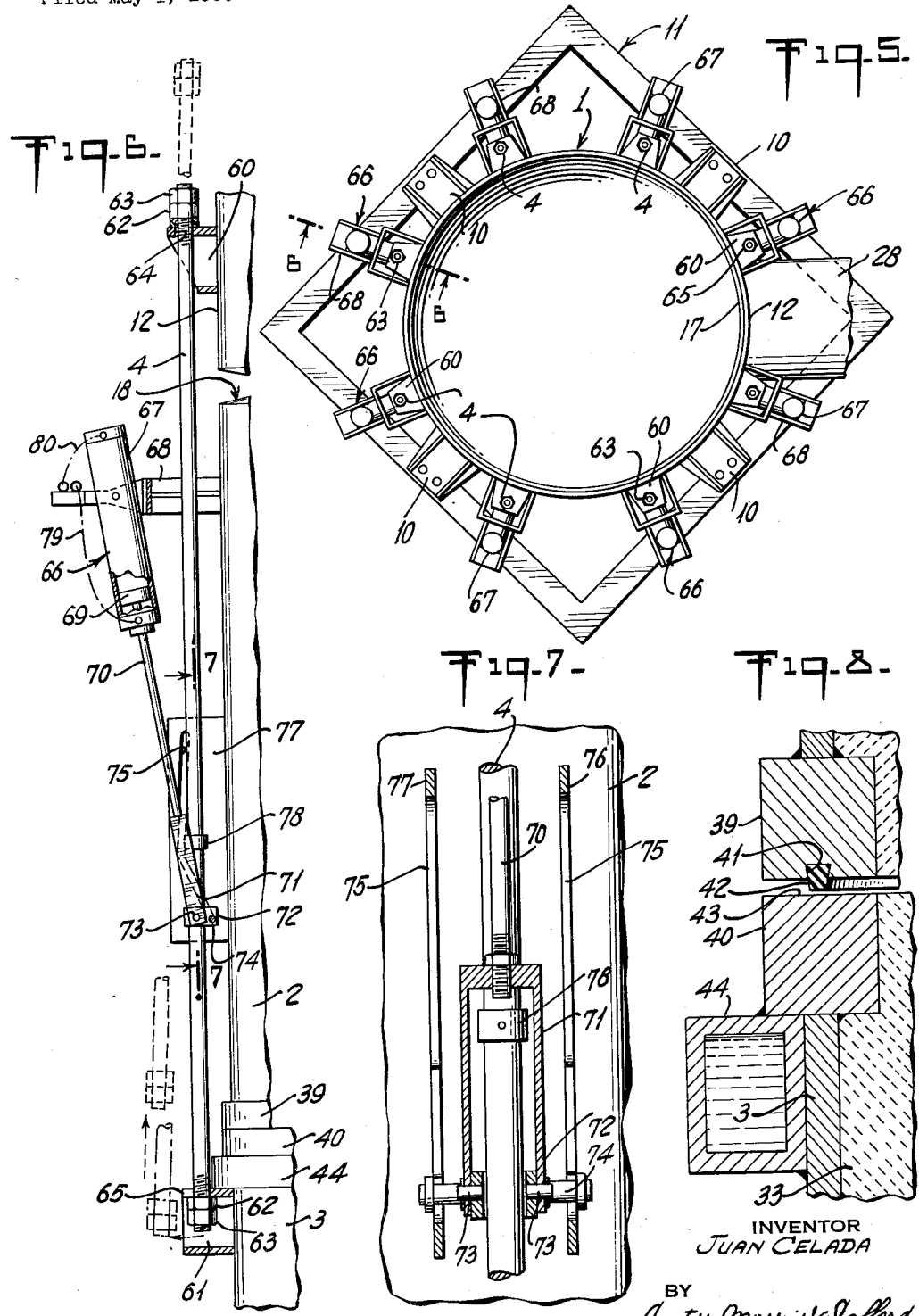
INVENTOR
JUAN CELADA
BY Curtis, Morris & Safford
ATTORNEYS Sept. 4, 1962 J. CELADA 3,052,457
ORE TREATING APPARATUS
Filed May 1, 1958 4 Sheets-Sheet 4

INVENTOR
JUAN CELADA
BY
Curtis, Morris & Safford
ATTORNEYS

3,052,457
Patented Sept. 4, 1962

3,052,457
ORE TREATING APPARATUS
Juan Celada, Monterrey, Nuevo Leon, Mexico, assignor to Fierro Esponja SA, Monterrey, Nuevo Leon, Mexico
Filed May 1, 1958, Ser. No. 732,387
4 Claims. (Cl. 266—24)

The present invention relates to ore treating apparatus and more particularly to improvements in apparatus for reducing iron ore to sponge iron.

In the past it has been found most economical to reduce iron oxide ores to useable iron in blast furnaces of large capacity. Such furnaces are charged with successive layers of ore, coke and limestone and an air blast is directed through the furnace to burn the coke. The coke supplies carbon which combines with the oxygen in the ore to reduce it to metal and the burning of the coke provides the temperature necessary to produce the reaction and melt the metal. A blast furnace requires large quantities of coke and limestone which limit its location to a few areas where these materials are available. Also a blast furnace, when once started, must be continuously operated. Furthermore, a blast furnace and its auxiliary equipment is of massive proportions and, therefore, requires an extremely large capital investment to be competitive.

In my prior application for U.S. Letters Patent, Serial No. 676,072, filed August 5, 1957, now U.S. Patent No. 2,900,247, granted August 18, 1959, I have described and claimed a process for reducing iron ore to sponge iron by subjecting the ore to a reducing gas mixture at high temperature. This method eliminates the necessity of using coke and limestone so that it may be used wherever iron oxide ore is available. In accordance with my method the ore may be converted to sponge iron in individual batches at practically any location and at a cost in particular localities which is competitive with iron produced in blast furnaces. The apparatus for treating iron ore in accordance with my method may be made in relatively small units at an initial cost which is lower than the massive blast furnace per ton of iron capacity and one which provides a greater flexibility in production than a blast furnace.

One of the objects of the present invention is to provide an improved ore treating apparatus for reducing iron ore to sponge iron by subjecting it to a reducing gas mixture at high temperature.

Another object is to provide an improved ore treating apparatus of the type indicated which facilitates the batch handling of relatively large quantities of ore.

Another object is to provide a batch processing apparatus of the type indicated which may be easily and quickly opened to load and dump and closed to form a sealed reaction chamber.

Another object is to provide a retort for treating ore having separable parts forming a reaction chamber and in which one of the parts operates as a skip-cart for transporting ore to and sponge iron from the place of treatment.

Another object is to provide a retort for treating ore in batches which may be operated at high temperature without burning the ore supporting grates or sealing gaskets.

Still another object is to provide an ore treating apparatus of the type indicated which is of relatively simple and compact construction, adapted for economical manufacture and one which is reliable in operation.

These and other objects will become more apparent from the following description and drawings in which like reference characters denote like parts throughout the several views. In this specification and accompanying drawings I have shown and described a preferred embodiment of my invention; but it is to be understood that this embodiment is not intended to be exhaustive or limiting of the invention. On the contrary, the illustrated embodiment is given for the purpose of illustration only in order that others skilled in the art may fully understand the invention and the purpose thereof and the manner of applying it for practical use so that they may modify and adapt it in various forms, each as may be best suited to the conditions of a particular use.

In the drawings:

FIGURE 1 is a side elevational view of an ore reducing apparatus incorporating the novel features of the present invention and illustrating the manner in which the ore containing vessel is engaged with a cover to form a retort and moved away from the cover to dump and load;

FIGURE 2 is a front elevational view of the ore containing vessel partly in section to show a water cooled grate therein;

FIGURE 3 is a sectional view of the retort in front elevation and showing the ore containing vessel clamped to the stationary cover by a fluid expansion lift in the cover;

FIGURE 4 is a view similar to FIGURE 3 showing the ore containing vessel lowered onto the rails;

FIGURE 5 is a plan view showing the frame for supporting the retort cover;

FIGURE 6 is a side elevational view of one of a plurality of tie-rods and the fluid operated mechanism for actuating the tie-rod to releasing position and raising the rods to clear the vessel;

FIGURE 7 is a transverse sectional view of the actuating mechanism for the tie-rod;

FIGURE 8 is an enlarged sectional view through the sealing rims of the retort to show the sealing gasket therebetween and the water jacket for cooling the gasket;

Figure 9:
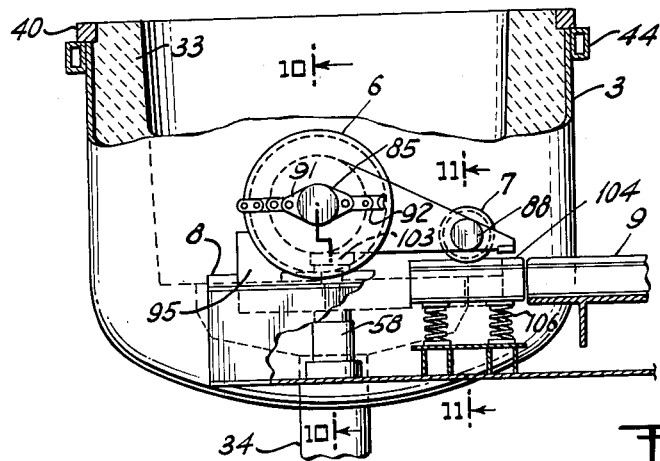
FIGURE 9 is a side elevational view of the ore containing retort vessel shown partly in section.

The apparatus of the present invention may have other applications but is particularly adapted for batch treatment of iron ore to convert it to sponge iron. As descirbed in my prior application, referred to above, a bed of the ore is subjected to reducing gas at high temperature which reacts with the ore to convert it from iron oxide to sponge iron. More specifically, the iron ore is subjected to a mixture of reducing gases, such as carbon monoxide and hydrogen to which a limited quantity of air has been added to increase its temperature. The quantity of added air is insufficient to materially change the reducing characteristic of the gas mixture, but increases its temperature to the degree necessary to cause the hydrogen and carbon monoxide to react efficiently with oxygen in the ore to convert it to water and carbon dioxide and thereby reduce the ore to sponge iron. The reducing gas mixture may be supplied initially from a gas producer or may be reformed natural gas from a reformer.

The iron ore is treated in batches of, for example, five to twenty-five tons of ore and the apparatus comprises a retort which may be closed to form a reaction chamber or opened to load iron ore therein and dump sponge iron therefrom. The apparatus is so constructed as to facilitate the handling of the relatively large batches or ore and the opening and closing of the apparatus.

Referring to the drawings, the retort 1 has separable upper and lower parts 2 and 3. The upper part 2 constitutes a stationary cover mounted on a suitable support while the lower part 3 constitutes a movable vessel for containing the material being treated. As illustrated in FIGURE 1, the ore containing vessel 3 is clamped to cover 2 by tie-rods 4 to form a reaction chamber 5 therebetween. Vessel 3 has wheels 6 and 7 at each side and underlying the wheels are tracks 8 and 9. Elevating mechanism, later to be described, operates to raise and lower the vessel 3 relative to the cover 2. Thus, the vessel 3 may be lifted from the tracks 8 and 9 into engagement with cover 2 to form the sealed reaction chamber 5 or may be lowered onto the tracks to operate as a skip-cart movable laterally of the cover to dump sponge iron therefrom and load iron ore therein.

The upper part of the retort 1 constituting the cover 2 comprises relatively movable cylindrical wall sections 12 and 13 arranged vertically one over the other, see FIGURES 1, 3, 4 and 5. As shown in FIGURES 1 and 5, the lower section 13 has supporting brackets 10 projecting laterally therefrom. In the illustrated embodiment there are four of such brackets 10 which overlie beams of an open rectangular frame 11 to which they are attached as by bolts, see FIGURE 5. Thus, the cover 2 is supported in a fixed position relative to the remainder of the apparatus.

The lower section 13 of cover 2 has an inner convex wall 14 which extends transversely of and is rigidly attached to the lower peripheral edge of the section as by welding. The inner dome-shaped wall 14 constitutes the top wall of the reaction chamber 5 and is lined with a heat insulating material such as fire brick, or the like. Overlying the dome-shaped inner wall 14 and spaced outwardly therefrom is a second transverse intermediate wall 15. Intermediate wall 15 is of the same general convex contour as the inner wall 14 and has a peripheral skirt 16 overlying the cylindrical section 13 to which it is attached as by welding. An outer transverse concave wall 17 overlies the intermediate wall 15 in spaced relation thereto and has its outer edges attached to the upper peripheral edge of the upper cylindrical section 12 as by welding.

The upper and lower cylindrical wall sections 12 and 13 of the cover 2 are connected by a bellows 18 to permit relative movement therebetween and form an expansion chamber 19 between the intermediate and outer walls 15 and 17. The bellows 18 may have other forms, but in the illustrated embodiment comprises annular plates 20 and 21 attached at their outer periphery to the upper and lower edges of the cylindrical sections 12 and 13, respectively. The inner edges of the plates 20 and 21 are connected to each other by a ring 22 to provide a liquid tight seal. Annular plates 20 and 21 are composed of a material to permit relative flexing when the outer wall 17 is moved upwardly away from the intermediate wall 15.

Section 12 constitutes a lift and is moved upwardly relative to section 13 by a hydraulic or pneumatic fluid supplied to the expansion chamber 19 under pressure. For this purpose a pipe 23 is connected to the lower section 13 above the intermediate wall 15. A two-way valve 24 is connected to the pipe 23 which in one position supplies the operating fluid under pressure from a pump line 25 and in the other position connects the pipe 23 to an exhaust line 26. One arrangement which has been found to be very satisfactory is to maintain a supply of liquid in the expansion chamber 19 and supply air under pressure through line 23 and exhaust the air from the chamber through line 26. When the operating fluid is supplied to the expansion chamber 19 under pressure it acts against the outer wall 17 and raises the wall and upper section 12 relative to the intermediate wall 15 and lower section 13.

The reaction chamber 5 is insulated from the expansion chamber 19 by the air space between the inner wall 14 and intermediate wall 15 of the lower section 13 of the cover 2. Openings 27 are provided in the peripheral wall of section 13 for circulating ambient air therethrough to maintain a relatively cool temperature therein. As illustrated in FIGURE 1, the openings 27 are arranged in vertically spaced pairs circumferentially around the cover section.

The reducing gas mixture is supplied to the reaction chamber 5 through a gas inlet pipe 28. Pipe 28 extends through the cylindrical wall of the annular section 13 of the cover 2 and through the inner wall 14 forming the top of the reaction chamber 5. As the gas mixture is supplied to the reaction chamber 5 at high temperature the interior of the gas inlet pipe has an insulating lining 29.

The lower ore containing vessel 3 is of cylindrical form having an open top and closed bottom. Vessel 3 is lined with an insulating fire brick 33 and its open end is of the same diameter as the cover 2. A gas outlet pipe 34 projects from the bottom of the vessel 3 and is in the form of an elbow for telescopic engagement with an exhaust pipe 36. In the embodiment illustrated, the end of the outlet pipe provides a laterally extending nipple 35 which extends into the open end of the exhaust pipe 36 having O-seal rings 37 mounted in grooves therein and engaging the outer periphery of the nipple 35. The outlet pipe 34 and end of the exhaust pipe 36 have water jackets 38 and 38a to cool the joint and O-seals 37. The water jacket 38a on the exhaust pipe 36 also is provided with port openings 45 between the O-seals 37 to apply pressure thereto and insure a tightly sealed joint. Thus, the nipple 35 on outlet pipe 34 provides a quick detachable connection between the vessel 3 and the exhaust pipe 36.

As shown in FIGURES 1, 3, 4 and 6, the ore containing vessel 3 is clamped to the cover 2 by means of tie-rods 4 to provide a gas tight seal therebetween. To this end, the lower and upper ends of the cover 2 and ore containing vessel 3 have sealing rings 39 and 40 on their outer peripheries, see FIGURE 8. As shown in detail in FIGURE 8, the sealing ring 39 on the cover 2 has an annular recess 41 with a gasket 42 mounted therein. The ring 40 on the upper edge of the ore containing vessel 3 has an annular seat 43 opposite the gasket 42 and engaged by the latter to form a sealed gas tight joint therebetween. A water jacket 44 surrounds the sealing ring 40 on the ore containing vessel 3 and is in thermal contact therewith to cool the ring and gasket.

The ore containing vessel 3 also is provided with a grate 48 adjacent the bottom thereof and spaced from the gas outlet 34. Grate 48 may be made of a suitable material which will withstand the high temperature of the gases leaving the reaction chamber 5, but as illustrated in FIGURES 2 and 3, the grate 48 is in the form of a plurality of spaced, water cooled bars. A liquid coolant, such as water, is supplied to the grate bars through inlet and outlet passages 50 and 51. As illustarted in FIGURE 2, the peripheral edge of the grate rests on a ledge 52 at the interior of the ore containing vessel 3. The liquid coolant is delivered from a source of supply through pipe 53 and is discharged through an exhaust pipe 54. A branch pipe 55 also supplies the liquid coolant to the annular jacket 44 surrounding the sealing ring 40 adjacent the gasket 42. As shown in FIGURE 1, the supply pipe 53 has a detachable coupling 56 for connecting it to a flexible hose line 57 so that the latter may be either disconnected from the ore containing vessel or moved therewith with respect to the cover 2.

As stated above, the ore containing vessel 3 may be raised and lowered relative to the cover 2 by elevating mechanism to provide a reaction chamber 5 or skip-cart for dumping sponge iron or loading iron ore. The elevating mechanism may comprise the fluid operated upper lift section 12 of the cover acting through the tie-rods 4 for raising and lowering the ore containing vessel 3. In the illustrated embodiment, the fluid operated upper section 12 of the cover 2 is supplemented by separate hydraulic lifts 58 located at each side of retort 1 between the vessel and the wheel 6. Lifts 58 raise and lower vessel 3 relative to the cover 2 and the tie-rods 4 hold the vessel against the cover. The purpose of using auxiliary lifts 58 in addition to the upper lift section 12 is to limit the flexing of the walls 20 and 21 of bellows 18 to the minimum required to tightly clamp the vessel 3 to the cover 2. In FIGURES 1 and 3, the expansion of the bellows 18 is exaggerated for purposes of illustration. It is to be understood, however, that the fluid operated upper section 12 of the cover 2 operating through the tie-rods 4 can be used to raise and lower the vessel 3 without the use of auxiliary lifts 58.

In the illustrated embodiment, eight of such tie-rods 4 are shown arranged in equally spaced relationship around the outer periphery of the retort 1. Each of these tie-rods 4 extends between outwardly projecting lugs 60 and 61 on the upper fluid actuated section 12 of cover 2 and the ore containing vessel 3. The tie-rods have threaded ends with an engaging nut 62 at each end contacting the lugs 60 and 61, respectively, and a lock nut 63 engaging and holding the nut 62. Referring to FIGURE 6, the upper end of each tie-rod 4 extends through an enlarged hole 64 in the lug 60 on the cover 2 while the opposite end extends through an open ended slot 65 in the lug 61 on the vessel. When the nuts 62 on the ends of the tie-rods 4 are engaged with the lugs 60 and 61 and a motive fluid under pressure is supplied to the expansion chamber 19 the upper section 12 of the cover moves upwardly with respect to the lower section 13 to cause the tie-rods to lift the ore containing vessel 3 into sealing engagement with the bottom of the cover 2 to close and seal the reaction chamber. When the motive fluid is released from the expansion chamber 19 by turning the valve 24, the upper section 12 lowers the tie-rods 4. When auxiliary lifts 58 are used the tie-rods 4 lower the vessel 3 onto the lifts which releases the engagement of the nuts 62 with the lug 61. The lifts 58, in turn, lower the vessel 3 onto the tracks 8 and 9.

As shown in FIGURES 6 and 7, a pneumatic or hydraulic actuator 66 is provided for each tie-rod which moves the lower end of the rod laterally out of engagement with its lug 61 and raises the rod above the ore containing vessel 3. Each actuator 66 comprises a cylinder 67 pivotally mounted to rock on a bracket 68 projecting laterally from the lower cover section 13. A piston 69 is provided in the cylinder 67 having a piston rod 70 extending therefrom with a yoke 71 at its outer end. As shown in FIGURE 7, the yoke 71 straddles a collar 72 loosely fitting the tie-rod 4 and embraces pins 73 projecting laterally from the collar. Pins 74 also project from the collar 72 and project through cam slots 75 in spaced plates 76 and 77. Cam slots 75 extend outwardly at an angle and then upwardly in a direction substantially parallel with the sides of the cover 2. Mounted fast on the tie-rod 4 above the movable collar 72 is a fixed collar 78. Thus, when motive fluid is supplied through line 79 to cylinder 67 the piston rod 70 is raised which acts through the yoke 71 and the pins 73 to raise the collar 72 along the tie-rod 4. As the ends of the pins 74 ride in the inclined portions of the cam slots 75 they cam the collar 72 and tie-rod 4 outwardly away from the lug 61 from the full line position to the dot and dash line position illustrated in FIGURE 6. Continued upward movement of the collar 72 relative to the tie-rod 4 causes it to engage the fixed collar 78 on the rod and lift the rod upwardly above the top of the ore containing vessel 3 as illustrated by dotted lines in FIGURE 6. When the tie-rod 4 is to be engaged with the lug 61 on vessel 3, motive fluid is supplied through the line 80 to the top of the cylinder 67 which actuates piston rod 70 downwardly in a path governed by the cam slots 75 to first lower the rods and then engage the nut 62 thereon with the lug.

Figure 10:
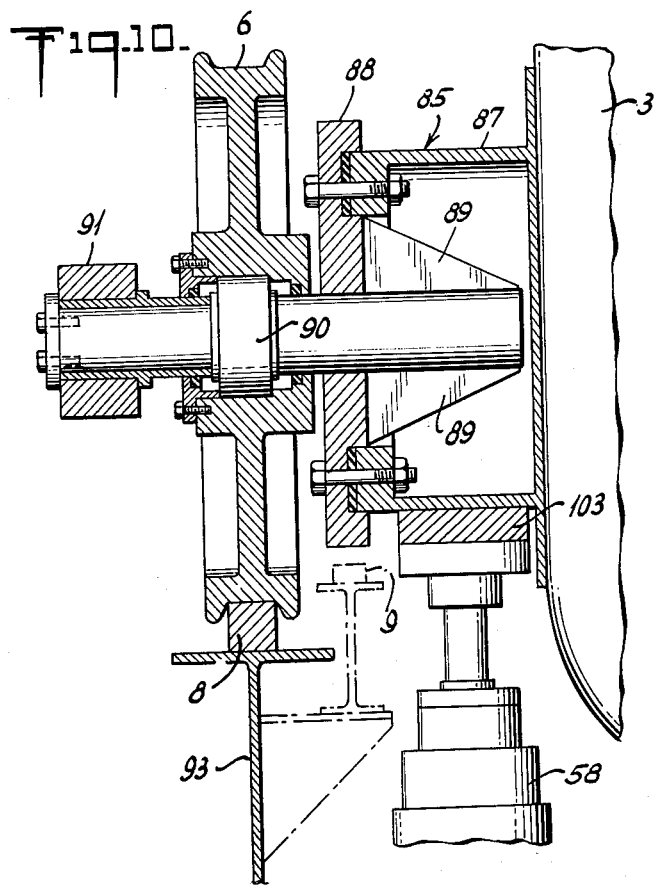
FIGURE 10 is an enlarged sectional view taken on line 10—10 of FIGURE 9 to show the trunnions at the sides of the vessel for mounting the wheels thereon to form a skip-cart.

As shown in FIGURES 1 and 10 the wheels 6 are mounted on trunnions 85 and 86 projecting laterally from the sides of the ore containing vessel 3 to form a skip-cart. Each trunnion 85 and 86 is mounted in an annular boss 87 projecting laterally from the side of the vessel 3. The trunnion 85 or 86 is in the form of a shaft projecting through a plate 88 which, in turn, is bolted to the outer end of the boss 87. The inner end of the trunnion 85 or 86 is braced by webs 89 attached to the plate 88 and trunnion as by welding and the outer end of the trunnions project laterally from the plate. A wheel 6 is mounted in a roller bearing 90 on the outwardly projecting end of trunnions 85 or 86 and overlies a track 8. As shown in FIGURES 1 and 9, the plate 88 at each side of retort 1 projects rearwardly from the boss 87 and mounts the wheel 7 at its rearward end which overlies a track 9.

Figure 11:
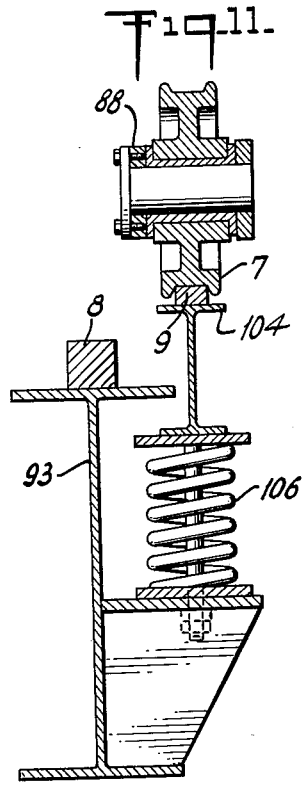
FIGURE 11 is a sectional view taken on line 11—11 of FIGURE 9 to show the spring mounting of a section of the inner tracks at the dumping station to provide a shock absorber.

The trunnions 85 and 86 project laterally beyond the wheels 6 and each trunnion mounts a link 91 for connection to a driving chain 92. It will be observed by reference to FIGURE 1 that the wheels 6 at each side of the vessel 3 are mounted forwardly of the center of gravity of retort 1 while the wheels 7 are mounted rearwardly of the center of gravity to hold the skip-cart 3 in upright position on the tracks. However, the center of gravity is located only slightly to the rear of the wheels 6 so that the cart may be easily dumped. As shown in FIGURE 11, the tracks 8 and 9 are mounted on an I-beam frame 93 to adapt the skip-cart 3 to be transported laterally of the cover. As shown in FIGURE 1, stops 94 are provided on the track 9 for engagement by the wheels 7 to locate the cart directly under the cover 2 in its rearward position and stops 95 are provided on the tracks 8 for engagement by the wheels 6 to limit the forward movement of the cart in its dumping and loading position.

The skip-cart 3 is propelled along the tracks 8 and 9 from a position underlying the cover 2 to its dumping position laterally of the cover by the endless driving chains 92. Each driving chain 92 has its ends connected to the link 91 at the end of the trunnion 85 or 86 and extends forwardly over an idler sprocket 96 and rearwardly over a driving sprocket 97. Driving sprockets 97 are mounted on shafts 98 connected to be driven by a suitable motor 99, see FIGURE 1. Motor 99 is reversible so that when it drives the sprockets 97 counterclockwise, as viewed in FIGURE 1, it draws the driving chain 92 around the idler sprocket 96 and propels the cart 3 forwardly to dumping and loading positions. When the motor drives the shaft 98 clockwise, it pulls the chain 92 toward the driving sprocket 97 and propels the cart rearwardly until it underlies the cover 2. Controls, not shown, control the motor 99 to propel the skip-cart 3 in either direction and limit the forward and rearward movement of the cart.

When the ore containing skip-cart and retort vessel 3 underlies the cover 2, the trunnion supporting bosses 87 overlie the auxiliary hydraulic lifts 58. The bosses 87 have pads 103 on their lower side for engagement by the lifts 58. The pads 103 extend rearwardly to underlie the center of gravity of the vessel 3 so that it may be lifted by the lifts 58 without tilting. It will be understood that suitable control means are provided to operate the lifts 58 in proper sequence with the fluid operated lift section 12 of the retort cover 2 and tie-rod actuators 66 to raise the vessel 3 to engage the tie-rods 4 therewith and then clamp the vessel to the cover.

As shown in FIGURES 9 and 11, the forward ends of the tracks 9 are made in separate sections 104 from the remainder of the track and are supported by heavy springs 106. Thus, the springs 106 constitute shock absorbers to absorb the force applied by the wheels 7 when the cart 3 is tilted to its upright position after a dumping operation. One form of apparatus having now been described in detail, the mode of operation is explained below.

For the purpose of description, let it be assumed that the elements of the apparatus are in the position illustrated in FIGURE 1, the vessel 3 is filled with iron ore and clamped to the cover 2 by the tie-rods 4 and reducing gas is being circulated through the reaction chamber 5 from the inlet pipe 28 at the top of the chamber, through the bed of ore in the chamber and out through the outlet pipe 34 at the bottom of the chamber and exhaust pipe 36. The high temperature gas mixture flowing through the ore in the reaction vessel reduces the ore to sponge iron. When all of the ore has been converted to sponge iron the flow of reducing gas mixture is stopped. Auxiliary lifts 58 are then raised into engagement with the pads 103 at each side of the vessel 3 as illustrated in FIGURE 2. Valve 24 is turned 90° from the position illustrated in FIGURE 1 to shut off the supply of motive fluid to the expansion chamber 19 and release the fluid therein which flows through the exhaust pipe 26. The upper lift section 12 of the cover 2 then releases the tension on the tie-rods 4 due to the flexing of the walls 20 and 21 of the bellows 18 from the position shown in FIGURE 3 to that shown in FIGURE 4.

Motive fluid is then supplied to the tie-rod actuators 66 through the line 79, see FIGURE 6, to actuate the pistons 69 upwardly in cylinders 67. Upward movement of the pistons 69 is transmitted through the connecting rods 70 to first rock the rods 4 outwardly from engagement with the lugs 61 on the vessel 3 and then upwardly out of the path of the vessel. Vessel 3 with the sponge iron therein is then lowered by the auxiliary lifts 58 from the position shown in FIGURE 3 to that shown in FIGURE 4 to engage the wheels 6 and 7 with the tracks 8 and 9 at each side of the vessel.

Motor 99 is then energized which operates through the shafts 88 and sprockets 99 to drive the sprockets in a counterclockwise direction as viewed in FIGURE 1. Such movement of the sprockets 97 actuates the driving chains 92 and connecting links 91 to propel the vessel 3 toward the left. The vessel 3 then operates as a skip-cart to transport the sponge iron laterally away from the cover 2 from the full line position to the dot and dash position illustrated in FIGURE 1. During the initial movement of the skip-cart 3 from the position illustrated in FIGURE 1, the nipple 35 of the gas outlet pipe 34 is withdrawn from the exhaust pipe 36. Also during the movement of skip-cart 3, the flexible hose for supplying cooling water may be dragged with the cart or disconnected at the coupling 56. At the end of the travel of the skip-cart 3 the wheels 6 engage the stops 95. An operating mechanism, not shown, then tips the skip-cart to the dot and dash line position illustrated to dump the sponge iron into a pit between the tracks 8 and 9.

After the sponge iron has been dumped the skip-cart 3 is tilted to its upright position and loaded with a new batch of iron ore. Motor 99 is then reversed to propel the ore containing skip-cart vessel 3 rearwardly to its initial position where the wheels 7 engage stops 94 to locate the vessel directly under the cover 2. During such movement the nipple 35 at the end of the outlet pipe 34 enters the end of the exhaust pipe 36 and is sealed therein by the O-seal ring 37. Liquid coolant under pressure from the jacket 38a also flows through the ports 45 into the space between the O-seal rings 37 to insure a tight seal and prevent flow of high temperature gas which would burn the O-seals.

The ore containing vessel 3 is then raised into sealing engagement with the cover 2 by actuating the parts in reverse order from that previously described. In other words, the auxiliary lifts 58 are actuated to lift the vessel 3 until the sealing ring 40 is tightly engaged with the gasket 42 in the sealing ring 39 on the cover 2. Motive fluid is then supplied through the lines 80 to the tie-rod actuators 66 to lower the tie-rods 4 and engage the nuts 62 with the lugs 61. Valve 24 is then turned to the position illustrated in FIGURE 1 to supply motive fluid under pressure to the expansion chamber 19. The motive fluid under pressure then lifts the upper section 12 of the cover 2 relative to the lower section 13 and acts through the tie-rods 4 to lift the vessel 3 and hold its sealing ring 40 against the sealing ring 39 of the cover. Reducing gas is then supplied to the inlet pipe 28 for circulation through the ore bed in the reaction chamber 5 to process the new batch of ore.

During operation of the retort, a coolant fluid such as water is supplied through the pipe line 53 to the grate 48 and through the line 55 to the cooling water jacket 44. Thus, the grate 48 and the sealing gasket 42 are cooled during the high temperature reaction in the retort.

It will now be observed that the present invention provides an improved ore treating apparatus which facilitates the batch handling of relatively large quantities of ore. It will also be observed that the present invention provides a batch processing apparatus which may be easily and quickly opened to load and dump and closed to form a sealed reaction chamber. It will further be observed that the present invention provides a retort having a movable part which may be operated as a skip-cart for transporting ore to and sponge iron from the place of treatment. It will still further be observed that the present invention provides an ore treating apparatus for reducing iron ore to sponge iron which is of relatively simple and compact construction, adapted for economical manufacture and one which is reliable in operation.

While a single embodiment of the invention is herein illustrated and described it will be understood that changes may be made in the construction and arrangement of elements without departing from the spirit or scope of the invention. Therefore, without limitation in this respect the invention is defined by the following claims:

1. Apparatus for converting iron ore to sponge iron by subjecting it to reducing gas at a high temperature in the range of 1700° F. to 2000° F. comprising a retort having separable parts, the upper part constituting a stationary refractory-lined cover and the lower part constituting a movable refractory-lined ore containing vessel, a frame for supporting the stationary cover in fixed position, a rigid refractory-lined gas inlet pipe connected to the cover as an integral part thereof, the movable ore containing vessel having wheels at its opposite sides and a pipe projecting from its lower end for detachable connection to a gas outlet, means at the interengaging edges of the cover and vessel forming a gas tight seal therebetween, tracks underlying the wheels of the vessel, elevator means for raising and lowering the vessel toward and away from the stationary cover and clamping it in sealing engagement with the cover, said elevator means comprising an expansible chamber on the top of the stationary cover, tie rods depending from the expansible chamber for detachable connection with the vessel and means for supplying fluid under pressure to the expansible chamber, said vessel being lowered from the cover onto the tracks by said elevator means, and power operated means for propelling the vessel along the tracks laterally of the cover to discharge sponge iron therefrom and load iron ore therein.

2. Apparatus in accordance with claim 1 in which the cover has a peripheral wall of separate adjacent sections, an inner chamber forming wall extending transversely of one peripheral wall section, an intermediate transverse wall spaced from the inner chamber forming wall and rigidly attached to said one peripheral wall section and an outer wall spaced from the intermediate wall and rigidly attached to the other peripheral wall section, said expansible chamber comprising a flexible fluid tight bellows connecting the sections of the peripheral wall between the intermediate and outer walls to permit relative movement therebetween, and said one peripheral wall section having openings for circulating a gas between the inner and intermediate transverse walls to provide an insulating barrier between the inner chamber forming wall and the fluid in the expansible chamber.

3. Apparatus in accordance with claim 1 in which the ore containing vessel has locking lugs, each tie rod has one end pivotally connected to the movable part of the expansion chamber and a head at its opposite end for engaging a locking lug on the vessel, a cam track for each tie rod mounted on the cover, a guide yoke slidable on each tie rod intermediate its ends and having a cam follower engaging its cam track, a cylinder mounted to rock on the cover, a piston rod having a piston in the cylinder and connected to reciprocate the guide yoke relative to the cam track to rock the tie rod laterally toward and away from the vessel, and means for supplying a motive fluid to the cylinder to actuate the piston rod in opposite directions.

4. Apparatus for converting iron ore to sponge iron by subjecting it to reducing gas at high temperature comprising a retort having separable parts, the upper part constituting a stationary cover and the lower part constituting a movable ore containing vessel, the cover and vessel having cooperating edges to provide a gas tight seal therebetween, a frame structure for supporting the stationary cover in fixed position above the ore containing vessel, said cover having an inner chamber forming wall, an intermediate wall spaced from and rigidly attached to the inner wall and an outer movable wall spaced from the intermediate wall, a flexible fluid tight bellows connected between the intermediate and outer walls to form an expansible chamber therebetween, said cover having openings between the inner and intermediate walls for circulating a gas to provide an insulating barrier therebetween, a rigid refractory lined gas inlet pipe connected to said stationary cover, elevating means for raising and lowering the vessel toward and away from the stationary cover and clamping it in sealing engagement therewith comprising the expansion chamber, tie rods depending from the chamber for detachable connection with said ore containing vessel and means for supplying an operating fluid under pressure to the expansion chamber which acts between the stationary cover and ore containing vessel to engage the cooperating edges under pressure to insure a gas tight seal therebetween, a gas outlet pipe detachably connected to the bottom of the ore containing vessel, lugs on said ore containing vessel, each of said tie rods having one end pivotally connected to the movable part, the expansion chamber and a head at its opposite end for interlocking engagement with the lugs on the vessel, a cam track for each tie rod mounted on the cover, a guide yoke slidable on each tie rod intermediate its ends and having a cam follower engaging its cam track, a cylinder mounted to rock on the cover, a piston rod having a piston in the cylinder and connected to reciprocate the guide yoke on the tie rod relative to the cam track to rock the rod and head laterally toward and away from the vessel, and means for supplying a motive fluid to the cylinder to actuate the piston rod in opposite directions.

References Cited in the file of this patent

UNITED STATES PATENTS

| | | |
|---|---|---|
| 1,350,440 | Davis | Aug. 24, 1920 |
| 1,359,875 | Da Costa | Nov. 23, 1920 |
| 1,798,715 | Aldrich et al. | Mar. 31, 1931 |
| 2,258,431 | Wellman | Oct. 7, 1941 |
| 2,367,262 | Brassert | Jan. 16, 1945 |
| 2,551,341 | Scheer et al. | May 1, 1951 |
| 2,640,624 | Madaras | June 2, 1953 |
| 2,709,078 | Stoddard et al. | May 24, 1955 |
| 2,885,201 | Evenstad | May 5, 1959 |

FOREIGN PATENTS

| | | |
|---|---|---|
| 61,798 | Sweden | Nov. 30, 1923 |